Feb. 9, 1960  L. A. DOLAN  2,924,240
MULTIPLE UNIT VALVE
Filed Aug. 26, 1954  2 Sheets-Sheet 2
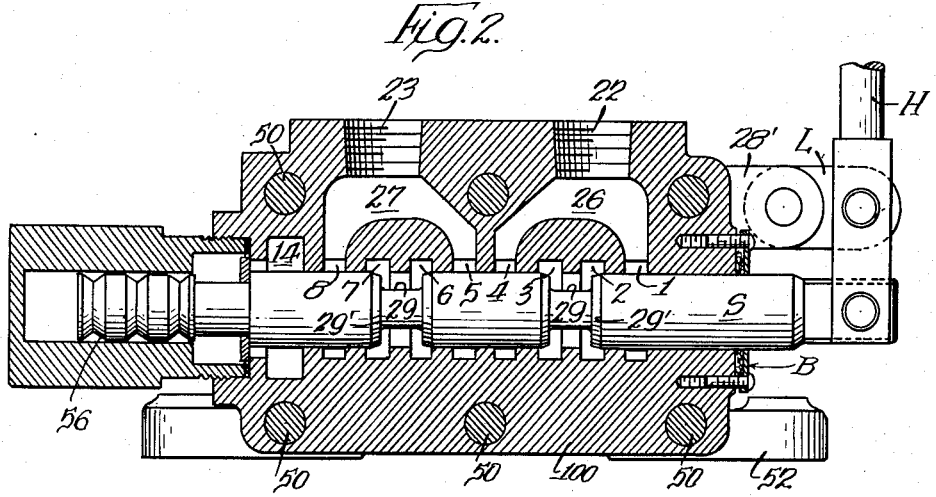
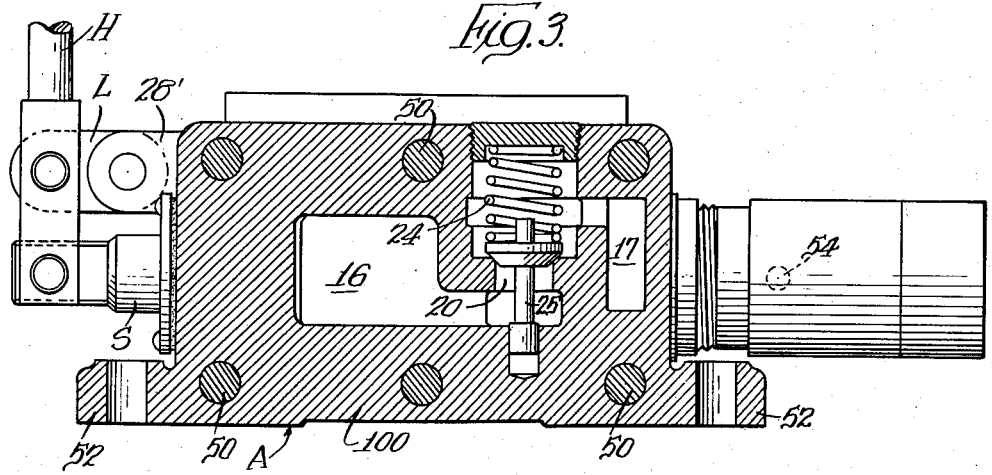
INVENTOR.
Louis A. Dolan
BY Schroeder, Hofgren,
Brady and Wegner, Attys.

United States Patent Office 2,924,240
Patented Feb. 9, 1960

2,924,240

MULTIPLE UNIT VALVE

Louis A. Dolan, Rockford, Ill., assignor to Sundstrand Corporation, a corporation of Illinois Application August 26, 1954, Serial No. 452,311

6 Claims. (Cl. 137—622)

This invention relates to valves commonly referred to in the art as stack valves and has for a general object the provision of a new and improved multiple unit valve stack, as well as the provision of a new and improved valve structure adapted to be used as one unit in a multiple valve stack.

A further object of the invention is to provide a valve structure for use as one of a series of units in a multiple unit valve stack comprising a housing having a valve bore for receiving a slidable three-position valve member, a novel arrangement of multiple lands and grooves in the bore, inlet and outlet passages intersecting certain of the grooves, and motor ports connected with other grooves adapting the structure for use in controlling a single-acting motor or a double-acting motor to block both motor ports from pressure or to connect either motor port to pressure and connect the other motor port to exhaust.

Another object is to provide a new and improved valve housing of the type described above for receiving a slidable four-position valve member adapted in one position to block both motor ports from pressure in either of two other positions to connect either port to pressure while connecting the other port to exhaust, or in a fourth "float" position to connect both motor ports to exhaust.

A further object of the invention is to provide a multiple housing valve stack, each housing having a bore and motor ports communicating with the bore, an inlet passage and an outlet passage communicating with the bore for each of the motor ports, each of an inlet and outlet passage defining with the bore a substantially straight continuous passage through the housing, the continuous passages being axially spaced of the bore, the inlet passages merging near an abutting face of the housing to form a single large passageway extending axially for the spacing of the continuous passages and the outlet passages similarly merging into an outlet passageway near an opposite abutting face of the housing, the inlet and outlet passageways being co-extensive and in register.

Another object is to provide a separator plate for use between the adjacent valve structures of a valve stack which mounts a seal ring connecting passageways in the valve structures and which is provided with means affording a mounting support for a valve operating handle.

Other objects and advantages will become readily apparent from the following detailed description taken in connection with the accompanying drawings, in which:

Fig. 2 is a sectional view taken on the line 2—2 of Fig. 1; and

Fig. 3 is a sectional view taken on the line 3—3 of Fig. 1.

Figure 1:
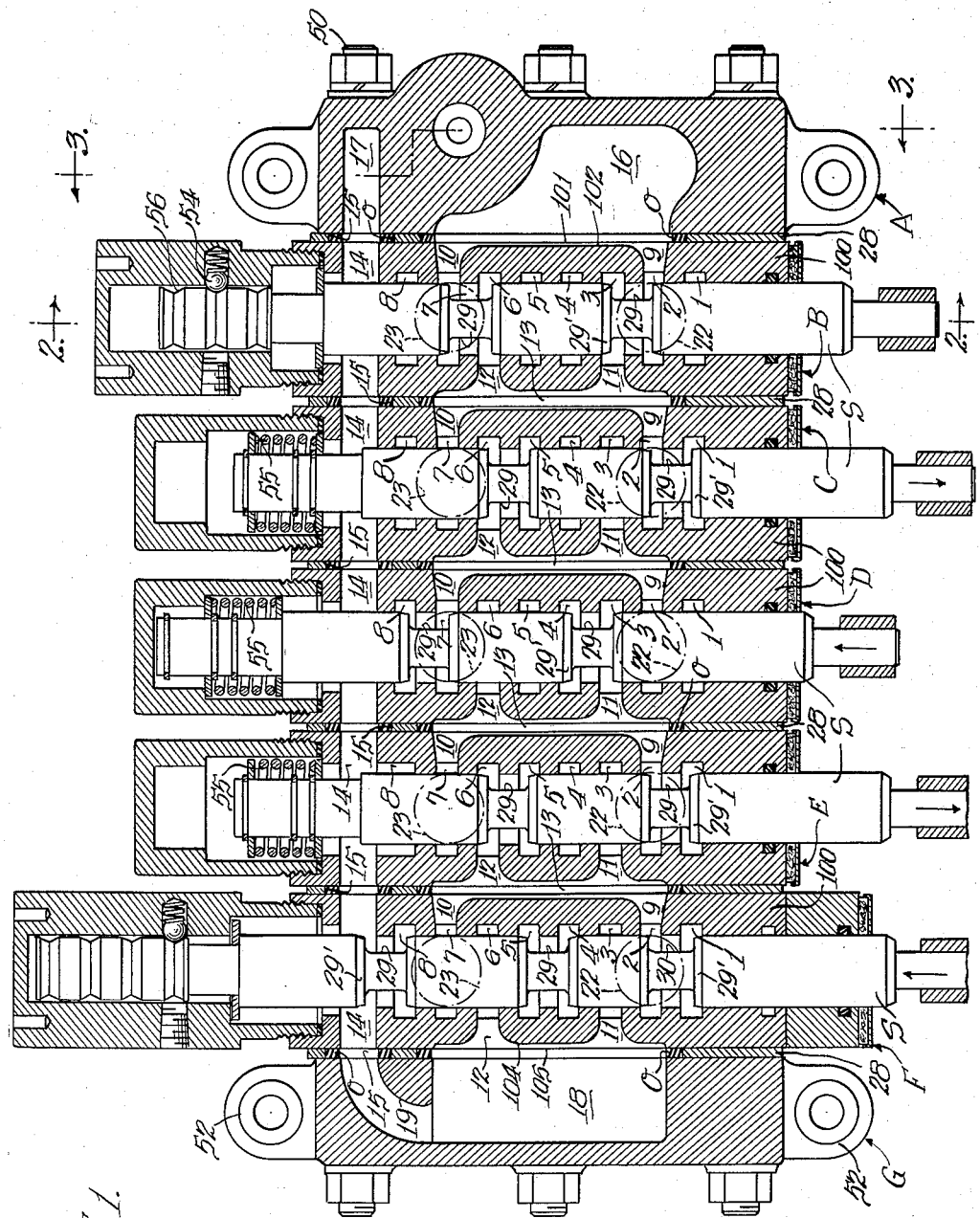
Fig. 1 is a sectional view through a multiple unit valve arrangement embodying the invention.

The invention further resides in the combination, construction and arrangement of parts illustrated in the accompanying drawings and while I have shown therein a preferred embodiment, I wish it to be understood that the same is susceptible of modification and change within the scope of the appended claims.

The valves of this invention are of particular use in the mobile equipment field where it is often desirable to control two or more hydraulic cylinders or motors simultaneously. Any number of valve units may be fastened together to perform any desired sequence of operation. Typical applications include road graders, bulldozers, snowplows, lift trucks, and the like. A typical circuit would include a pump, a tank, the valves of this invention, a relief valve in the line or built into the stack valve, and suitable cylinders or hydraulic motors. The valves may be utilized to control either single-acting or double-acting motors.

Referring to Fig. 1, in a preferred embodiment, as illustrated, the invention includes valve units B, C, D, E, and F and cover housings A and G. These units and cover housings are arranged in adjacent relation and bolted together as shown at 50. The cover housings A and G are provided with apertured ears 52 by which the multiple unit valve stack may be mounted.

Each of the valve units B—F includes a housing 100 having a longitudinally extending valve bore. Each bore is provided with axially spaced annular grooves indicated by the reference numerals 1—8. Each housing also includes inlet passages 9 and 10 which intersect the bore at grooves 2 and 7 respectively and outlet passages 11 and 12 which intersect the bore at grooves 3 and 6 respectively. Referring now to Fig. 2, grooves 1 and 4 are connected by a feed passageway 26 which is completely within the housing and grooves 5 and 8 are connected by a similar feed passageway 27. Motor ports 22 and 23, spaced axially of the bore, intersect the passageways 26 and 27 respectively. A bypassageway 14 extends completely through the housing and intersects the bore. The housings 100 of valve units B through F are alike except that in the housing of unit E, the groove 8 is widened to extend to the bypassageway 14.

Referring again to Fig. 1, each of an inlet passageway and an outlet passageway defines with the bore a substantially straight, continuous, transverse passageway through the housing. These continuous passageways are spaced axially of the bore to correspond substantially to the spacing of the motor ports. Inlet passages 9 and 10 merge near the face 101 of the housing to form a single large inlet passageway 102 extending axially about the distance of the spacing between the continuous passageways. Outlet passageways 11 and 12 merge into a similar large outlet passageway 104 near the opposite abutting face 105 of the housing. These large inlet and outlet passageways are co-extensive and in register to define a passageway indicated at 13 connecting a pair of valve housings. This arrangement reduces the fluid velocity and greatly reduces the pressure drop through the multiple unit stack. Where the pressure drop across the valves in an old arrangement was 150 pounds, the drop with the valves of this invention is only 25 pounds.

The inlet cover housing A is provided with a chamber 16 having a cross-section corresponding to a passageway 102 and in register therewith. This chamber may be connected to a pump to supply fluid under pressure. The outlet cover housing G is provided with a chamber 18 in register with a passageway 104. The chamber 18 may be connected to tank. Referring to Fig. 3, the inlet cover housing A is provided with a relief valve 25 in a chamber 20 extending off the chamber 16. The valve is biased to a closed position by a spring 24. If the passage of fluid through the stack valve is blocked, pressure in the chamber 16 will open the relief valve to permit bypass of the fluid to the passageway 17 which is in register with the by passageways 14 in the respective units. The bypassageways 14 are connected by a passageway 19 to the chamber 18 in the outlet cover housing G.

Separator plates 28 are provided between each of the housings. These plates have an opening 15 in register with bypassageway 14, and an opening in register with the passageways 13. The openings in the separator plate 28 are slightly larger than the passageways with which they register and an O ring seal member designated "O" is inserted to prevent leakage. Referring again to Fig. 2, the separator plates 28 include an apertured ear 28' extending beyond the valve housing which affords a mounting support for the valve stem operating handle H for the adjacent valve.

A valve stem S is slidably mounted within the bore of each housing. The identical valve stems in each of the units B, C, D, and E are each three-position members and each includes two grooves 29. The valve stem in the unit F is a four-position member and is provided with an additional groove 30. The stem is chamfered at 29' adjacent each of the grooves 29.

The grooves 1—8 in the bore are machined and by closely controlling the spacing and depth of these grooves as well as the bore size and stem size, it is possible to reduce leakage to a minimum. The ground chamfers on the stem adjacent its grooves contribute to smooth, infinitely variable speeds.

The valve stem in each of the units C, D, and E is spring biased at 55 to a neutral center position and may be operated to move the valve stem to either of two positions on opposite sides of the neutral position. The valve stem in the unit B is retained in any of its three positions by a spring pressed detent 54 co-operating with grooves 56 in the stem. The valve stem in the unit F is also retained in any of its four positions by a spring pressed detent co-operating with grooves in the stem.

For purposes of explaining the operation, it is assumed that each of the units B, C, D, and F are connected to double-acting motors, and that the unit E is connected to a single-acting motor through the front port 22, the port 23 being closed by plug.

Assuming that all valve stems are in the neutral position as indicated in unit B, oil enters chambers 16 in the inlet cover housing A, flows through passageway 102 into passageways 9 and 10, into grooves 2 and 7, thence to grooves 3 and 6 to passageways 11 and 12. From passageways 11 and 12, the oil flows into passageway 13 and into passageways 9 and 10 in the next valve. This same flow pattern is repeated through sections C, D, E, and F. From F the flow is through passageway 104 and then into chamber 18 from where it is piped back to tank.

Following the circuit as it is actually shown, oil enters chamber 16 in inlet cover housing A, flows through passageway 102 and into passageways 9 and 10. From there, the oil flows into grooves 2 and 7 in unit B. The stem being in the neutral position, the grooves 29 in the stem connect grooves 2 and 3 in the bore with each other and also connect grooves 6 and 7 in the bore with each other. Oil flows from groove 2 to groove 3 and into passageway 11. Oil also flows from groove 7 to groove 6 and thence to passageway 12. Oil from passageways 11 and 12 flows into passageway 13 and thence into passageways 9 and 10 of unit C.

In unit C, the stem is in the "Out" position, as indicated by the arrow, so that oil entering groove 7 from passage 10 is blocked, forcing the total flow of oil through passageway 9 to groove 2. Groove 29 in the stem connects grooves 2 and 1 in the bore so that oil flows from groove 2 to groove 1 thence into passageway 26 to port 22 and to either a cylinder or a motor. Groove 4, which is connected to groove 1 by passageway 26, is blocked by the stem. Oil returning from the cylinder or motor enters port 23, flows into passageway 27 and into grooves 5 and 8. Groove 8 is blocked by the stem. Groove 5 is connected to groove 6 by stem groove 29, allowing oil to flow from groove 5 to groove 6, into passageway 12 and from there to passageway 13.

In unit D, the stem is in the "In" position, as indicated by the arrow, so that oil entering groove 2 from passageway 9 is blocked, forcing all oil flow from passageway 13 through passageway 10 into groove 7, from groove 7 through stem groove 29 into groove 8 and into passageway 27. Groove 5 is blocked by the stem so all oil flows from passageway 27 to port 23 and to the cylinder or motor. Oil returning from the cylinder or motor enters port 22 and flows through passageway 26 to grooves 1 and 4. Groove 1 is blocked by the stem so all oil flows to groove 4, through stem groove 29 to groove 3 in the bore and thence to passageway 11, through 11 to passageway 13.

In unit E, oil enters passages 9 and 10 from passageway 13. The stem is in the "Out" position, forcing all oil into groove 2 as groove 7 is blocked by the stem. Oil then goes to groove 1 through stem groove 29 and thence to passageway 26 and out port 22. Groove 4 is blocked by stem. With port 23 plugged, there is no return oil in this position. In neutral position, oil flows through this section as previously described. To return oil from the cylinder, the stem of section E is pushed to the "In" position, allowing the oil to enter port 22, and flow to passageway 26. Groove 1 is blocked by the stem so oil flows to groove 4 then through stem groove 29 to groove 3 in the bore and into passageway 11 to passageway 13. At the same time, oil entering passageway 10 from the preceding unit flows into groove 7 in the bore which is connected to groove 8 by stem groove 29. Groove 8 in the bore is open to bypassageway 14 allowing oil to flow through bypassageway 14, opening 15 and on through the next section to passageway 19 and then to chamber 18 and to tank.

Unit F operates in three positions in the same manner as unit B; front port 22, or rear port 23 may be activated, or the flow can be through the valve as previously described. The provision of an additional groove in the stem of this valve enables a fourth or "float" position as shown. In this position, all oil entering the valve flows into passageways 9 and 10; groove 7 is blocked by the stem so all oil is diverted into groove 2. Grooves 1 and 2 are joined by stem groove 30 so oil flows from groove 2 to groove 1, through passageway 26 to groove 4 which is connected to groove 5 by stem groove 29 and then through the passage 27 to groove 8 which is open to passageway 14 to tank.

If an excess pressure should develop in the valve, pressure in chamber 16 would be transferred to oil in chamber 20, which would cause relief valve 25 to open, compressing spring 24. Oil would then flow to passageway 17 and on to the tank through passageway 14. When the pressure drops, the spring reseats the valve, closing off the relief circuit.

A handle is provided for operating each of the valve stems S and each of the handles is mounted by means of an adjacent separator plate. As shown in Fig. 2, a handle H is pivotally connected at one end to a valve stem S and is pivotally connected to a link L which is pivotally mounted on the apertured ear 28' extending from an adjacent separator plate 28. The link permits a pivotal motion of the handle to operate the valve stem in a straight line motion.

I claim:

1. A valve structure for use in a multiple unit valve stack, comprising, a valve body having a longitudinal valve bore and a plurality of longitudinally spaced annular grooves in the bore including, a pair of adjacent motor grooves located approximately midway of the length of the bore, a pair of outlet grooves one positioned longitudinally outward from each motor groove, a pair of inlet grooves one positioned longitudinally outward from each outlet groove, and a second pair of motor grooves one positioned longitudinally outward from each inlet groove, an inlet passageway opening to an outer face of said valve body and having a pair of branch inlet passages leading respectively to said inlet grooves, an outlet passage opening to the opposite outer face of the valve body and having branch outlet passages leading respectively to said outlet grooves, a first feed passageway opening to another outer face of said valve body and having branch feed passages leading respectively to an outwardly spaced motor groove and an inwardly spaced motor groove, and a second feed passageway opening to said other outer face of the valve body and having branch feed passages leading respectively to the other outwardly spaced motor groove and the other inwardly spaced motor groove.

2. A valve unit for use in a multiple unit valve stack, comprising: a housing having a longitudinal valve bore and a plurality of axially spaced annular grooves in the bore, an inlet passageway having a pair of branch inlet passages intersecting respectively two of said grooves, an outlet passageway having a pair of branch outlet passages intersecting respectively two other of said grooves, a pair of feed passageways formed within the housing, one of said feed passageways connecting two other of said grooves and the other feed passageway connecting two other of said grooves, and a pair of motor ports intersecting respectively said feed passageways; and a valve stem slidable in the valve bore and having valving, in one position of the valve stem, to connect said inlet passages respectively to said outlet passages and to block said feed passageways, in a second position of the valve stem, to block one inlet passage, to connect the other inlet passage to one feed passageway and to connect the other feed passageway to one outlet passage, and in a third position of the valve stem to block said other inlet passage, to connect said one inlet passage to said other feed passageway, and to connect said one feed passageway to the other outlet passage.

3. A valve unit for use in a multiple unit valve stack, comprising: a valve body having a longitudinal valve bore and a plurality of longitudinally spaced annular grooves in the bore including, a pair of adjacent motor grooves located approximately midway of the length of the bore, a pair of outlet grooves one positioned longitudinally outward from each motor groove, a pair of inlet grooves one positioned longitudinally outward from each outlet groove, and a second pair of motor grooves one positioned longitudinally outward from each inlet groove, an inlet passageway opening to one outer face of said valve body and having a pair of branch inlet passages leading respectively to said inlet grooves, an outlet passage opening to the opposite outer face of the valve body and having branch outlet passages leading respectively to said outlet grooves, a first feed passageway opening to another outer face of said valve body and having branch feed passages leading respectively to an outwardly spaced motor groove and an inwardly spaced motor groove, a second feed passageway opening to said other outer face of the valve body and having branch feed passages leading respectively to the other outwardly spaced motor groove and the other inwardly spaced motor groove, and a bypassageway extending through the valve body from said one outer face to said opposite outer face and intersecting the valve bore longitudinally outward from one of said outwardly spaced motor grooves; and a valve stem slidable in the valve bore and having at least a pair of longitudinally spaced reduced portions on the stem providing stem grooves for connecting bore grooves, said stem having a first neutral center position connecting said inlet grooves respectively to said outlet grooves and blocking said motor grooves, said stem being movable in one direction from said first position to a second position wherein one inlet groove is blocked, the other inlet groove is connected to a motor groove associated with said first feed passageway and a motor groove associated with said second feed passageway is connected to one of said outlet grooves, said stem being movable in the opposite direction from said first position to a third position wherein said other inlet groove is blocked, said one inlet groove is connected to the other motor groove associated with said second feed passageway and said other motor groove associated with said first feed passageway is connected to said other outlet groove.

4. A valve unit for use in a multiple unit valve stack, comprising: a valve body having a longitudinal valve bore and a plurality of longitudinally spaced annular grooves in the bore including, a pair of adjacent motor grooves located approximately midway of the length of the bore, a pair of outlet grooves one positioned longitudinally outward from each motor groove, a pair of inlet grooves one positioned longitudinally outward from each outlet groove, and a second pair of motor grooves one positioned longitudinally outward from each inlet groove, an inlet passageway opening to one outer face of said valve body and having a pair of branch inlet passages leading respectively to said inlet grooves, an outlet passage opening to the opposite outer face of the valve body and having branch outlet passages leading respectively to said outlet grooves, a first feed passageway opening to another outer face of said valve body and having branch feed passages leading respectively to an outwardly spaced motor groove and an inwardly spaced motor groove, and a second feed passageway opening to said other outer face of the valve body and having branch feed passages leading respectively to the other outwardly spaced motor groove and the other inwardly spaced motor groove, a bypassageway extending through the valve body from said one outer face to said opposite outer face and intersecting the valve bore longitudinally outward from the outwardly spaced motor groove associated with said second feed passageway, the outwardly spaced motor groove adjacent said bypassageway extending longitudinally outward to connect with the bypassageway; and a valve stem slidable in the valve bore and having at least a pair of longitudinally spaced reduced portions on the stem providing stem grooves for connecting bore grooves, said stem having a first neutral center position connecting said inlet grooves respectively to said outlet grooves and blocking said motor grooves, said stem being movable in one direction from said first position to a second position wherein one inlet groove is blocked, and the other inlet groove is connected to the outwardly spaced motor groove associated with said first feed passageway, said stem being movable in the opposite direction from said first position to a third position wherein said one inlet groove is connected to said outwardly spaced motor groove adjacent said bypassageway, said other inlet groove is blocked, and the inwardly spaced groove associated with the first feed passageway is connected to one outlet groove.

5. A valve unit for use in a multiple unit valve stack, comprising: a valve body having a longitudinal valve bore and a plurality of longitudinally spaced annular grooves in the bore including, a pair of adjacent motor grooves located approximately midway of the length of the bore, a pair of outlet grooves one positioned longitudinally outward from each motor groove, a pair of inlet grooves one positioned longitudinally outward from each outlet groove, and a second pair of motor grooves one positioned longitudinally outward from each inlet groove, an inlet passageway opening to one outer face of said valve body and having a pair of branch inlet passages leading respectively to said inlet grooves, an outlet passage opening to the opposite outer face of the valve body and having branch outlet passages leading respectively to said outlet grooves, a first feed passageway opening to another outer face of said valve body and having branch feed passages leading respectively to an outwardly spaced motor groove and an inwardly spaced motor groove, and a second feed passageway opening to said other outer face of the valve body and having branch feed passages leading respectively to the other outwardly spaced motor groove and the other inwardly spaced motor groove, a bypassageway extending through the valve body from said one outer face to said opposite outer face and intersecting the valve bore longitudinally outward from one of said outwardly spaced motor grooves; and a valve stem slidable in the valve bore and having at least three longitudinally spaced reduced portions on the stem providing stem grooves for connecting bore grooves, said stem having a first position connecting said inlet grooves respectively to said outlet grooves and blocking said motor grooves, said stem having a second position wherein one of said inlet grooves is blocked, the other inlet groove is connected to said first feed passageway and said second feed passageway is connected to one of said outlet grooves, said stem having a third position wherein said other inlet groove is blocked, said one inlet groove is connected to said second feed passageway and said first feed passageway is connected to said other outlet groove, and said stem having a fourth position wherein one inlet groove is blocked the other inlet groove is connected to one feed passageway, and said feed passageways are connected to each other, and the other feed passageway is connected to said bypassageway.

6. A multiple unit valve stack, comprising, a plurality of adjacent serially arranged valve units, each valve unit comprising: a housing having a longitudinal valve bore and a plurality of axially spaced annular grooves in the bore, an inlet passageway having a pair of branch inlet passages intersecting respectively two of said grooves, an outlet passageway having a pair of branch outlet passages intersecting respectively two other of said grooves, a pair of feed passageways formed within the housing, one of said feed passageways connecting two other of said grooves and the other feed passageway connecting two other of said grooves and a pair of motor ports intersecting respectively said feed passageways; and a valve stem slidable in the valve bore and having valving, in one position of the valve stem, to connect said inlet passages respectively to said outlet passages and to block said feed passageways, in a second position of the valve stem, to block one inlet passage, to connect the other inlet passage to one feed passageway and to connect the other feed passageway to one outlet passage, and in a third position of the valve stem to block said other inlet pasage, to connect said one inlet passage to said other feed passageway, and to connect said one feed pasageway to the other outlet passage; the inlet passageway and the outlet passageway in each valve housing being of similar configuration and cross-sectional area, and the valve housings being arranged with the inlet passageway in each successive downstream unit in register with the outlet passage in the preceding upstream unit; and a flat separator plate in abutting relationship between each pair of valve housings, each separator plate between adjacent valve housings having an opening in register with the connecting outlet and inlet passageways in adjacent valve housings, a ring shaped sealing member positioned in the opening in each separator plate between adjacent valve housings to provide a seal between valve housings, said separator plates each having an apertured ear portion extending longitudinally outwardly beyond adjacent valve housings, pivoted link means mounted on said apertured ear means, and valve member operating handles pivotally connected to said link means and pivotally connected respectively to at least some said valve stems.

References Cited in the file of this patent

UNITED STATES PATENTS

| | | |
|---|---|---|
| 1,016,167 | McCulloch | Jan. 30, 1912 |
| 1,955,154 | Temple | Apr. 17, 1934 |
| 2,247,140 | Twyman | June 24, 1941 |
| 2,345,224 | Upp | Mar. 28, 1944 |
| 2,362,671 | Schwan | Nov. 14, 1944 |
| 2,483,651 | Lee | Oct. 4, 1949 |
| 2,486,087 | Wright | Oct. 25, 1949 |
| 2,586,932 | Gardiner | Feb. 26, 1952 |